United States Patent

Katori et al.

[11] Patent Number: 5,837,392
[45] Date of Patent: Nov. 17, 1998

[54] SOFT MAGNETIC THIN FILM AND THIN FILM MAGNETIC HEAD USING SAME

[75] Inventors: Kenji Katori; Hiroyuki Ohmori; Mitsuharu Shouji, all of Kanagawa; Hiroshi Onuma, Miyagi, all of Japan

[73] Assignee: Sony Corporation, Tokyo, Japan

[21] Appl. No.: 745,180

[22] Filed: Nov. 7, 1996

[51] Int. Cl.$^6$ .......................................................... G11B 5/66
[52] U.S. Cl. ..................... 428/692; 428/64 R; 428/64 T; 428/64 TS; 428/64 TM; 428/900; 204/192.2; 360/126
[58] Field of Search ........................... 428/694 R, 694 T, 428/692, 900, 694 TS, 694 TM; 204/192.2; 360/126

[56] References Cited

U.S. PATENT DOCUMENTS 5,538,802  7/1996  Kitaori ................................. 428/684 T
5,573,863  11/1996  Hayakawa et al. ................. 428/684 T
5,599,635  2/1997  Katori ..................................... 428/692

*Primary Examiner*—Leszek Kiliman
*Attorney, Agent, or Firm*—Hill & Simpson

[57] ABSTRACT

A soft magnetic thin film according to the present invention can exhibit not only good soft magnetic properties but also an excellent anti-corrosion property, a low magnetostriction, a high saturation magnetic flux density and a high bonding ability to a base plate or substrate. The soft magnetic thin film has a composition of $(Fe_aM_bCu_cRu_d)_eN_fO_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d \leq 8$, $a+b+c+d=100$, $0.5 \leq f \leq 15$, $0.1 \leq g \leq 13$ and $e+f+g=100$, the soft magnetic thin film being prepared by reaction-sputtering in which a nitrogen and a steam ($H_2O$) are introduced.

7 Claims, 10 Drawing Sheets

SOFT MAGNETIC THIN FILM AND THIN FILM MAGNETIC HEAD USING SAME

BACKGROUND OF THE INVENTION

This invention relates to an Fe—N-based soft magnetic thin film and a thin film magnetic head using the soft magnetic thin film, and more particularly to an improvement in soft magnetic properties of the soft magnetic thin film.

Recently, signals having a shorter wavelength have been used for recording and reproducing of information data in order to achieve a high image quality, a high densification, a large capacity storage or the like of video signals or other information signals. For this reason, there have been used magnetic recording media in which a magnetic layer having a high coercive force is formed, such as a metal tape prepared by applying a ferromagnetic metal powder on a base film, a deposited tape prepared by directly depositing a ferromagnetic material on a base film or the like.

On the other hand, as a material for a magnetic core which is one component of a magnetic head, metal magnetic materials having a high saturation magnetic flux density, a high magnetic permeability and a low coercive force are required to cause the afore-mentioned magnetic recording media to effectively exhibit the inherent properties.

As a soft magnetic material satisfying these requirements, Fe—N-based materials are hitherto known. Studies have been made on the use of the Fe—N-based materials as a material for the magnetic core and it has been attempted to forming a thin film thereof by vapor phase film-forming techniques.

In such a thin film magnetic head, an Ni—Fe plated film is frequently used as a magnetic core thereof which is typically suitable for a hard disc. In other application fields, Fe—Al-based alloys or Co-based alloys have been used in the form of sputtered film or deposited film.

Features of such a thin film magnetic head reside in that the magnetic core thereof can be prepared by pattern formation inherent in the recent thin film formation techniques, such as photo-lithography, etching, plating, lift-off system or the like, so that a wafer having a uniform quality can be mass-produced, and that this type of the magnetic head has a structure capable of exhibiting a short magnetic path and a low inductance as compared to laminated-type magnetic heads or so-called metal-in-gap-type magnetic heads (MIG heads). Examples of known thin film magnetic heads include those for a hard disc, which are used, for example, as a reproducing element including a magnetic-resistance effect element.

The reproducing element is composed of the magnetic-resistance effect element such as Ni—Fe or the like, a bias conductor composed of Ti, Cu or the like for applying a bias voltage to the magnetic-resistance effect element, and shielding members between which the magnetic-resistance effect element and the bias conductor are interposed. The reproducing element is formed on a base film composed of $Al_2O_3$—Ti or the like.

A recording element is laminated over the reproducing element and has such a structure that a thin film coil composed of a Cu-plated film or the like, a recording gap film composed of $Al_2O_3$ or the like and a coil-flattening layer composed of a photo-resist or the like are interposed between recording cores composed of an Ni—Fe plated film. In many cases, the lower recording core is common to the upper shielding material of the reproducing element.

In recent years, there is a tendency that the thin film magnetic head for a hard disc has been changed in structure from conventional ones having only an induction-type structure to those having the afore-mentioned laminated structure. The laminated-type recording and reproducing magnetic head includes an induction-type element serving for writing a recording signal and a magnetic-resistance effect element serving for reading a reproduction signal. Further, as the magnetic-resistance effect element, it is intended to use a so-called large-scale magnetic-resistance effect element.

As discussed above, in order to achieve a highly-densified magnetic recording on the magnetic recording media having a high coercive force, it is required to use a metal magnetic material having a high magnetic permeability, a high saturation magnetic flux density and a low coercive force as a material for the magnetic head.

Under these circumstances, Fe—N-based soft magnetic materials as the metal magnetic material have been continuously studied and investigated to improve a soft magnetic property, an anti-corrosion property or a wear resistance thereof. As a result, it has been found that the soft magnetic property and the anti-corrosion property of the soft magnetic material is improved by addition of Al, Nb or the like and introduction of oxygen and Cu thereinto. However, the improvement in the soft magnetic property and the anti-corrosion property can be achieved only after subjecting it to a heat treatment primarily using a elevated temperature as high as not less than 500° C. In general, in the case of bulk-type magnetic heads used in video tape recorders of 8-mm type or VHS-type, a magnetic gap is formed by fusion of the glass material, so that it is required to impart to the metal magnetic material a high heat resistance so as to withstand the heat treatment, for example, at not less than 500° C. which corresponds to a fusion temperature of the glass material.

On the other hand, in the case of the thin film magnetic heads, the magnetic gap is not formed by the glass fusion though a configuration thereof varies depending upon various factors, especially types of head-touch systems used therefor. The glass fusion has been used only partially to bond the magnetic head and a protective substrate with each other in the thin film magnetic head using a contact-type head touch,system. Thus, in the case of the thin film magnetic head using a non-contact-type head touch system, for example, thin film magnetic head for a hard disc, or magnetic heads used together with a protective substrate bonded thereto by an adhesive, since such a glass fusion is not employed, a degree of the heat resistance of the metal magnetic film is determined by other factors.

For example, in a typical head structure of the thin film magnetic head used for a hard disc, its heat resistance must be determined so as to withstand such a temperature at which thermal degradation of the magnetic-resistance effect element in the reproducing element, carbonization of a resist resin as the flattening layer for the thin film coil when subjected to the heat treatment, or other changes in state of the element are caused. In this case, the heat resistance must be maintained in order to cause the metal magnetic film to exhibit a sufficient soft magnetic property.

In general, the magnetic-resistance effect element, especially a large-scale magnetic-resistance effect element, exhibits a poor heat resistance. In the production of the thin film magnetic head used for a hard disc, a reproducing element composed of the magnetic-resistance effect element and other components is first formed and thereafter a recording element is laminated over the reproducing element. Accordingly, if it is intended to prepare the magnetic core of the recording element from a metal magnetic material having a high saturation magnetic flux density other than Ni—Fe, there arises such a problem that the temperature of a heat treatment required to obtain a sufficient soft magnetic property of the metal magnetic material exceeds a heat-resisting temperature of the magnetic-resistance effect element disposed therebelow (generally in the order of 300° C.), or a heat-resisting temperature of the flattening layer for the coil, which is composed of the resist resin or the like.

The heat resistance of the afore-mentioned resist resin means a property withstanding not only deterioration in its insulating property due to the carbonization of the coil-flattening layer but also generation of gases due to difference between heat-treatment temperatures of the coil-flattening layer and the metal magnetic film. The latter gas generation occurs in the case where the heat-treatment temperature of the metal magnetic film is higher than that of the coil-flattening layer.

On the other hand, in thin film magnetic heads other than those used for a hard disc, recording and reproducing operations are performed by bringing the magnetic head into slide contact with the magnetic recording medium. In this case, abrasion or uneven abrasion occurring on a slide surface of the thin film magnetic head poses a problem. Accordingly, it is important to select an appropriate combination of a material for the slide surface of the thin film magnetic head and the magnetic recording medium.

For example, if conventional metal magnetic film composed of Ni—Fe plating film used in the thin film magnetic head for a hard disc is intended to apply to a magnetic core of the sliding-contact-type thin film magnetic head, the following problems are caused. That is, the amount of the metal magnetic film abraded when a magnetic tape is traveled therealong is considerably large as compared to those of other members constituting the sliding contact surface of the magnetic head, such as the base substrate, the magnetic gap or the like. As a result, a so-called uneven abrasion is caused so that the sliding-contact surface of the metal magnetic film is recessed relative to surfaces of the other members. In not only the thin film magnetic heads but also other types of magnetic heads, the uneven abrasion results in forming a space between the magnetic gap and the magnetic tape. Once such a uneven abrasion occurs, an intensity of the magnetic gap relative to the magnetic tape becomes low so that there arise a problem that an electro-conversion characteristic thereof is deteriorated especially in a high frequency range.

As described above, conventional soft magnetic thin films composed of Fe—M—Cu—N—O exhibits a proper soft magnetic property by heat-treating the film at a temperature in the order of 500° C. However, the magnetic core of the thin film magnetic head is required to exhibit a good property by heat-treatment using a temperature as low as not more than 300° C. Accordingly, if the soft magnetic thin film is applied to the magnetic core of the thin film magnetic head which is to be heat-treated at a temperature of 300° C. or lower, the magnetic core composed of conventional soft magnetic film cannot exhibit a sufficient soft magnetic property.

Further, in the case where the afore-mentioned soft magnetic thin film is used as the magnetic core of the thin film magnetic head in order to achieve a high densification recording, problems are posed on the heat resistance of the magnetic-resistance effect element installed on the reproducing element, the heat resistance of the coil-flattening layer composed of resist resin or the like, or separation of the film. In the case where the conventional metal magnetic film composed of Ni—Fe is applied to a medium-contact-type thin film magnetic head, there arises a problem that abrasion or uneven abrasion of the film is induced. However, as will be appreciated, the use of the metal magnetic film having an excellent heat resistance is not necessarily sufficient to provide a good thin film magnetic head. In addition to the heat resistance, it is also important to take into consideration specific structure of the thin film magnetic head to attain an excellent soft magnetic property.

SUMMARY OF THE INVENTION

The present invention has been made to overcome the afore-mentioned problems.

Accordingly, it is an object of the present invention to provide a soft magnetic thin film capable of exhibiting a good soft magnetic property even after a heat treatment using a temperature as low as not more than 300° C., and further showing an excellent corrosion resistance, a low magneto-striction, a high saturation magnetic flux density and a high adherence to a base plate.

It is another object of the present invention to provide a thin film magnetic head having a high reliability such as a high resistance to abrasion or uneven abrasion, and capable of performing a high densification recording.

As a result of intense studies and investigations made by the present inventors to achieve the above objects, it has been found that the magnetic thin film having an improved soft magnetic property, especially even after subjected to a heat treatment using a temperature as low as not more than 300° C., can be obtained by introducing $H_2O$ as a sputtering gas instead of $O_2$.

That is, in one aspect of the present invention, there is provided a soft magnetic thin film having a composition of $(Fe_aM_bCu_cRu_d)_eN_fO_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d \leq 8$, $a+b+c+d=100$, $0.5 \leq f \leq 15$, $0.1 \leq g \leq 13$ and $e+f+g=100$, the soft magnetic thin film being prepared by reaction-sputtering in which a nitrogen and a steam ($H_2O$) are introduced.

In a second aspect of the present invention, there is provided a thin film magnetic head including lower and upper magnetic cores both composed of a soft magnetic thin film and a thin film coil interposed between the lower and upper magnetic cores through insulating layers, the soft magnetic thin film having a composition of $(Fe_aM_bCu_cRu_d)_eN_fO_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d \leq 8$, $a+b+c+d=100$, $0.5 \leq f \leq 15$, $0.1 \leq g \leq 13$ and $e+f+g=100$, and being prepared by reaction-sputtering in which a nitrogen and a steam ($H_2O$) are introduced.

In a third aspect of the present invention, there is provided a thin film magnetic head having a laminated structure in which a plurality of soft magnetic thin films are laminated through intermediate layers, each of the soft magnetic thin films having a composition of $(Fe_aM_bCu_cRu_d)_eN_fO_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d \leq 8$, $a+b+c+d=100$, $0.5 \leq f \leq 15$, $0.1 \leq g \leq 13$ and $e+f+g=100$, and being prepared by reaction-sputtering in which a nitrogen and a steam ($H_2O$) are introduced.

These objects, features and advantages of the present invention will become more apparent from the following detailed description when read in conjunction with the accompanying drawings and the appended claims.

DETAILED DESCRIPTION OF PREFERRED EMBODIMENTS

Figure 1:
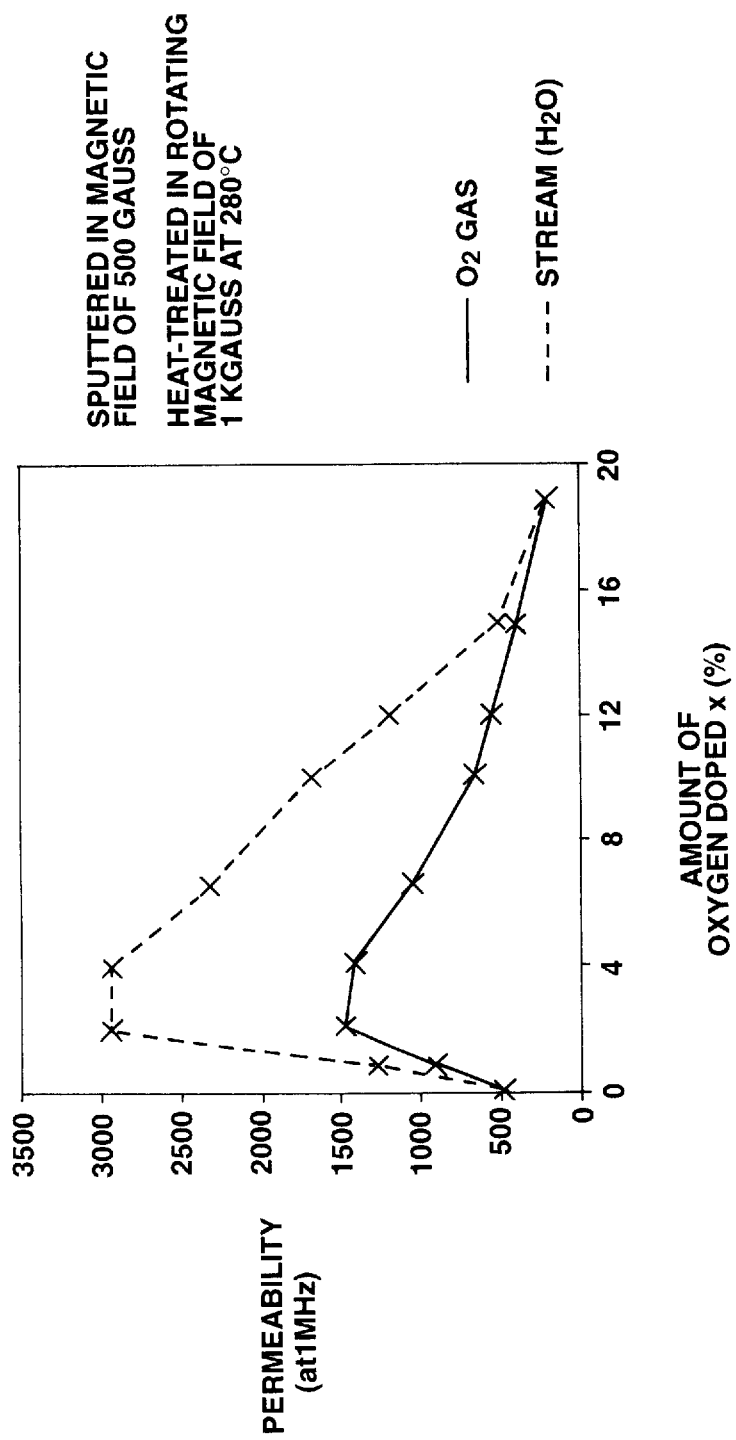
FIG. 1 is a characteristic curve showing a relationship between an amount of gas introduced and a magnetic permeability of a soft magnetic thin film according a first preferred embodiment of the present invention, with respect to kinds of the gas introduced.

The soft magnetic thin film according to the present invention has a composition of $(Fe_a M_b Cu_c Ru_d)_e N_f O_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d \leq 8$, $a+b+c+d=100$, $0.5 \leq f \leq 15$, $0.1 \leq g \leq 13$ and $e+f+g=100$. The soft magnetic thin film may be prepared by reaction-sputtering in which nitrogen and a steam ($H_2O$) are introduced.

The component M to be added may be combined elements composed of $M^I$ which represents at least one element selected from the group consisting of Al, Ga, Ti and rare earth elements, and $M^{II}$ which represents at least one element selected from the group consisting of Nb, Ta, V, Zr and Hf. In this case, the soft magnetic thin film has a composition of $(Fe_a M^I_j M^{II}_k Cu_c Ru_d)_e N_f O_g$. Preferred ranges of the respective elements in the composition are selected so as to satisfy the conditions of $0.1 \leq j \leq 2.5$, $0.1 \leq k \leq 2.5$, $0 \leq c \leq 8$, $0 \leq d \leq 5$, $0 \leq c+d \leq 8$, $a+j+k+c+d=100$, $0.5 \leq f \leq 15$, $0.1 \leq g \leq 13$ and $e+f+g+100$. These preferred ranges of the respective elements are deter mined taking into consideration magnetic properties such as a soft magnetic property or a saturation magnetic flux density, a heat resistance or an anti-corrosion property.

The afore-mentioned soft magnetic thin film can be prepared by thin film formation techniques such as a sputtering method.

The introduction of the respective elements can be carried out in the following manner. First, an alloy of the aimed element and Fe is prepared. The alloy is suitably used as a target for the sputtering method and has a composition of Fe—M—Cu where M represents at least one element selected from the group consisting of Si, Al, Ta, B, Mg, Ca, Sr, Cr, Mn, Zr, Nb, Ti, Mo, V, W, Hf, Ga, Ge and rare earth elements, or Fe—$M^I$—$M^{II}$—Cu where $M^I$ represents at least one element selected from the group consisting of Al, Ga, Ti and rare earth elements and $M^{II}$ represents at least one element selected from the group consisting of Nb, Ta, V, Zr and Hf.

Alternatively, chips of the respective elements to be added may be placed on the Fe target so as to be subjected to simultaneous sputtering. However, in the case where such a simultaneous sputtering method is used, there is a likelihood that regions having different compositions are present in the resultant magnetic thin film, so that it becomes difficult to maintain a uniform property of the magnetic thin film such as an anti-corrosion property which is exhibited by the addition of the elements.

The addition of nitrogen may be carried out by introducing a nitrogen gas into an atmosphere used for the formation of thin film, while the addition of oxygen may be carried out by introducing a steam ($H_2O$) into the atmosphere used for the formation of thin film.

Upon the formation of the thin film, a magnetic field acting in one direction may be applied by the combination of a permanent magnet placed on a side surface of a substrate, and a core composed of a soft magnetic material. Alternatively, the similar magnetic field may be applied by using an electromagnet.

The soft magnetic thin film prepared according to the present invention may be in the form of a single-layer film or a multi-layer film. In the case of the multi-layer film, the soft magnetic thin film may be of a laminated structure in which a plurality of the soft magnetic layers are alternately arranged through intermediate layers each composed of a magnetic metal such as permalloy or Co-based amorphous metal, a non-magnetic metal such as Ag or Cu, or a ceramic material such as Si—N or $SiO_2$.

In the formation of the soft magnetic thin film, when the magnetic field ranging form 1 kA/m to 1,000 kA/m is applied, a uniaxial magnetic anisotropy can be imparted to the resultant soft magnetic thin film. The application of the magnetic field is useful to apply the thin film to magnetic heads such as a thin film head which is required to have a magnetic anisotropy. Specifically, in order to impart the magnetic anisotropy to the soft magnetic thin film, it is necessary to place the thin film in a magnetic field not less than 1 kA/m. However, if the magnetic field applied exceeds 1,000 kA/m, the plasma is adversely affected by the magnetic field so that unstable discharge occurs.

The magnetic anisotropy imparted upon the formation of the thin film may be adjusted to a desired level, for example, the magnetic anisotropy can be decreased by heat-treating the thin film in a rotating magnetic field.

The primer coat layer of the soft magnetic thin film or the intermediate layers in the case of the laminated-type multi-layer soft magnetic thin film, may be composed of at least one metal selected from the group consisting of Ta, Nb, Zr, Ti, Al, Cr, Co, Mo, W, Pt, Au, Pd, Ag and V, whereby an adhesion of the soft magnetic thin film to the substrate can be enhanced.

In addition, the thin film magnetic heads according to the present invention includes lower and upper magnetic cores each of which is prepared from the soft magnetic thin film composed of a metal magnetic material, and a thin film coil interposed between the lower and upper cores through insulating layers.

In the thin film magnetic head according to the present invention, the lower and upper cores may be constructed of the afore-mentioned soft magnetic thin film. Specifically, the soft magnetic thin film used for the cores has a composition of $(Fe_aM_b—Cu_c—Ru_d)_e—N_f—O_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d+8$, $a+b+c+d=100$, $0.5 \leq f \leq 15$, $0.1 \leq g \leq 13$ and $e+f+g=100$. Such a soft magnetic thin film can be prepared by reaction-sputtering in which nitrogen and a steam ($H_2O$) are introduced.

In the case where the thin film magnetic head is provided with a coil-flattening layer composed of a resist resin, separation of the film from the substrate may be caused due to difference between a temperature of the substrate and a heat-treating temperature of the resist resin upon the formation of the film. Therefore, it is important to limit the temperature of the substrate to a level as low as possible upon the formation of the film. Further, it is also desired to maintain a low film stress in the compressed direction.

As described above, in accordance with the present invention, when the Fe—N—O-based soft magnetic thin film to which no metal element is added or the Fe—N-based soft magnetic thin film to which a given metal element is added, is formed, oxygen can be introduced to the reaction system not in the form of an oxygen gas but in the form of a steam ($H_2O$). The use of the steam for the introduction of oxygen is well known in such a process in which silicon of a semiconductor is oxidized. Further, it has been found that the use of the steam is also useful for preparing silicon nitride. This is because activated oxygen can be generated from the steam introduced with a high efficiency and then reacted with nitrogen, so that substitution-type iron nitride such as $Fe_4N$ is prevented from being produced whereby micro-crystalline iron is formed.

The afore-mentioned sputtering method in which the stream ($H_2O$) is introduced into the reaction system can be effectively applied to any of methods as previously proposed by the present inventors in Japanese Patent Application Laid-open (Kokai) No. Hei 5-159,222 (a method in which a soft magnetic material is prepared by introducing various elements into Fe—N—O), Japanese Patent Application Laid-open (Kokai) No. Hei 6-45,146 (a method in which the material is sputtered in magnetic field and heat-treated in rotating magnetic field to improve a soft magnetic property thereof), or Japanese Patent Application Laid-open (Kokai) No. Hei 5-325,851 (a method in which adhesion of the film is improved by forming a primer coat layer composed of various metal film). Further, in accordance with the present invention, since the specific alloy is used as a target, the soft magnetic thin film can be produced with a homogeneous composition so that a good anti-corrosion property can be imparted to the film.

Furthermore, in the thin film magnetic head in which lower and upper magnetic cores are each composed of such a soft magnetic thin film, there are advantages that the thin magnetic head can be processed at a low temperature and exhibit a high saturation magnetic flux density. In addition, from a standpoint of materials of the thin film magnetic head, the soft magnetic material can exhibit a considerably higher resistance to abrasion or uneven abrasion as compared to the Ni—Fe material used for the conventional thin film magnetic head for hard disc.

The several preferred embodiments according to the present invention are illustrated in more detail below by referring to the accompanying drawings.

First Preferred Embodiment

The soft magnetic thin film according to the first preferred embodiment of the present invention is prepared from an Fe—N-based material. In order to examine properties of various soft magnetic thin films, the following experimental examples and comparative examples were carried out.

Experimental Example 1:

In this Experimental Example, the soft magnetic thin film was formed while introducing nitrogen and a steam into Fe containing no element added. The procedure for the preparation of the soft magnetic thin film is carried out in the following manner. First, a target composed of pure iron was prepared. By using the target, an RF (high-frequency) sputtering was performed in an argon atmosphere containing a nitrogen gas and a steam so that the thin film (sample 2) having compositions as shown in Table 1 was prepared.

The sputtering was conducted at an output power of 300 W and a gas pressure (whole pressure) of 1.2 mTorr. The nitrogen content and the oxygen content in the film was controlled by varying an amount of the reaction gas introduced into an atmosphere in the reaction system. The results are shown in Table 1.

Experimental Example 2:

Experimental Example 1 was repeated in the same manner as described above except that the sputtering was conducted by further applying an magnetic field of 500 G to align directions of magnetic anisotropy of the resultant soft magnetic thin film (sample 3) with each other and thereby improve a soft magnetic property thereof. The results of the evaluation tests are also shown in Table 1.

Comparative Example 1:

Experimental Example 1 was repeated in the same manner as described above except that an oxygen gas was introduced instead of the steam so that a soft magnetic thin film (sample 1) was obtained.

After the film formation, the thus-prepared samples 1 to 3 were heat-treated at 280° C. in a rotating magnetic field of 1 kG. The heat treated samples were then examined for their soft magnetic properties as follows.

The respective Fe—N-based soft magnetic thin film samples prepared above were tested to study soft magnetic properties such as coercive force and magnetic permeability at 1 MHz before and after the heat-treatment in the rotating magnetic field, an anti-corrosion property or an abrasion resistance thereof.

The anti-corrosion property of the soft magnetic thin film was evaluated as follows.

A soft magnetic thin film having a thickness of 3 μm was formed on a crystallized glass substrate. The soft magnetic thin film was cut into a test piece having a size of 15 mm×15 mm. The test piece was immersed in 50 ml of 2% NaCl solution and kept oscillated for 96 hours at 30° C. Thereafter, the test piece was removed from the NaCl solution and subjected to a quantitative analysis to determine a total amount of iron eluted, inclusive of iron precipitates in the NaCl solution. The amount of iron eluted was used to evaluate an anti-corrosion property of the soft magnetic thin film.

The abrasion resistance of the soft magnetic thin film was evaluated in the following manner.

First, a dummy head composed of calcium titanate ($CaTiO_3$) having the same size as that of a magnetic head practically used in 8-mm video tape recorder, was prepared. A soft magnetic thin film was formed on a surface of the head which was brought into slide contact with a magnetic tape, under the same conditions as described above.

Next, the dummy head on which the soft magnetic thin film had been formed, was adhered to a head base member. The surface of the head was abraded by a wrapping tape. Successively, the head is mounted to a drum practically used for the 8-mm video tape recorder. A diamond indenter used for measuring a micro-Vikers hardness was brought into pressed contact with the head to form a pyramid-shape recess on the soft magnetic thin film.

Next, the thus-prepared head was mounted to an actual 8-mm video tape recorder. The 8-mm video tape recorder equipped with the head was placed within a thermo-hygrostat which was maintained at a relative humidity of 60% and a temperature of 25° C., and then an 8-mm VTR deposited tape was loaded into the video tape recorder and traveled along the head.

After the tape was traveled for 12 hours, the drum equipped with the head was removed from the video tape recorder. The dimension of the pyramid-shaped recess on the soft magnetic thin film was measured to determine an amount of the soft magnetic thin film abraded.

The anti-corrosion property and the abrasion property both were measured before and after the heat treatment. As a result, it was confirmed that no deterioration in these properties was observed even after the heat-treatment at 280° C. in the rotating magnetic field.

The evaluation results are shown in Table 1.

As will be appreciated from Table 1, it was found that the soft magnetic property of the thin film was improved by introducing the reaction gas composed of $N_2$ and $H_2O$ instead of the reaction gas composed of $N_2$ and $O_2$ Further, the soft magnetic property of the thin film was also improved when subjected to the heat treatment in magnetic field or rotating magnetic field.

Experimental Example 3:

In this Experimental Example, the Fe—N-based soft magnetic thin film (sample 5) including given elements was produced by sputtering in the atmosphere into which a steam was introduced. The aimed soft magnetic thin film having a composition of $(Fe_{97.6}Al_{1.1}V_{0.4}Nb_{0.4}Cu_{0.5})_{94}N_4O_2$ was produced by using a target having a composition of $Fe_{97.5}Al_{1.0}V_{0.5}Nb_{0.5}Cu_{0.5}$.

In the meantime, the conditions of sputtering, anti-corrosion test and abrasion test used in this Experimental Example were the same as those used in Experimental Example 1. The results of evaluation tests are also shown in Table 1.

Experimental Example 4:

Experimental Example 3 was repeated in the same manner as described above except that the sputtering was conducted by further applying an magnetic field of 500 G so that a soft magnetic thin film (sample 6) was obtained. The results of evaluation tests are also shown in Table 2.

Experimental Example 5:

Experimental Example 3 was repeated in the same manner as described above except that the sputtering was conducted by further applying an magnetic field of 30 G so that a soft magnetic thin film (sample 7) was obtained. The results of evaluation tests are also shown in Table 2.

Comparative Example 2:

Experimental Example 3 was repeated in the same manner as described above except that the sputtering was conducted by introducing oxygen instead of the steam, so that a soft magnetic thin film (sample 4) was obtained. The results of evaluation tests are also shown in Table 1.

Experimental Example 6:

Experimental Example 3 was repeated in the same manner as described above except that the composition of the aimed soft magnetic thin film was $(Fe_{98.1}Al_{1.1}V_{0.4}Nb_{0.4})_{94}N_4O_2$ prepared by replacing Cu of $(Fe_{97.6}Al_{1.1}V_{0.4}Nb_{0.4}Cu_{0.5})_{94}N_4O_2$ with Fe and an alloy having a composition of $Fe_{98.0}Al_{1.0}V_{0.5}Nb_{0.5}$ was used as a target, so that a soft magnetic thin film (sample 8) was obtained. The results of evaluation tests are also shown in Table 2.

Experimental Example 7:

Experimental Example 3 was repeated in the same manner as described above except that a pellet composed of copper was used as a target, so that a soft magnetic thin film (sample 9) was obtained. The results of evaluation tests are also shown in Table 2.

Experimental Example 8:

Experimental Example 6 was repeated in the same manner as described above except that the composition of the aimed soft magnetic thin film was $(Fe_{96.5}Al_{1.1}V_{0.4}Nb_{0.4}Ru_{1.6})_{94}N_4O2$ prepared by replacing a part (1.6 atomic %) of Fe in the composition used in Experimental Example 6 with Ru, and an alloy having a composition of $Fe_{96.4}Al_{1.0}V_{0.5}Nb_{0.5}Ru_{1.6}Cu_{0.5}$ was used as a target, so that a soft magnetic thin film (sample 11) was obtained. The respective properties of the thus prepared soft magnetic thin film were evaluated under the same conditions as in Experimental Example 3 except for those mentioned above. The results of evaluation tests are also shown in Table 2.

TABLE 1

| Sample | Remarks | Reaction gas | Magnetic field in sputtering process (Gauss) | Composition of thin film (atomic %) |
|---|---|---|---|---|
| 1 | No additive to Fe—N—O | $N_2 + O_2$ | None | $Fe_{96}N_4O_2$ |
| 2 | No additive to Fe—N—O | $N_2 + H_2O$ | None | $Fe_{96}N_4O_2$ |
| 3 | No additive to Fe—N—O | $N_2 + H_2O$ | 500 | $Fe_{96}N_4O_2$ |
| 4 | Given elements added | $N_2 + O_2$ | None | $(Fe_{97.6}Al_{1.1}V_{0.4}Nb_{0.4}Cu_{0.5})_{94}N_4O_2$ |
| 5 | Given elements added | $N_2 + H_2O$ | None | $(Fe_{97.6}Al_{1.1}V_{0.4}Nb_{0.4}Cu_{0.5})_{94}N_4O_2$ |

| Sample | After film formation but before heat treatment (at 1 MHz) Hc (Oe) | Permeability | After heat treatment in rotating magnetic field (1kGauss, 280° C. at 1 MHz) Hc (Oe) | Permeability | Amount of iron eluted (μg) | Amount of head abraded after 12 hour-travel (μm) |
|---|---|---|---|---|---|---|
| 1 | 1.5 | 500 | 1.3 | 600 | 320 | 1.5 |
| 2 | 0.8 | 1000 | 0.7 | 1200 | 300 | 1.5 |
| 3 | 0.2 | 1500 | 0.15 | 2000 | 70 | 1.5 |
| 4 | 1.0 | 700 | 0.7 | 1000 | 70 | 1.2 |
| 5 | 0.6 | 1100 | 0.5 | 1300 | 70 | 1.2 |

TABLE 2

| Sample | Remarks | Reaction gas | Magnetic field in sputtering process (Gauss) | Composition of thin film (atomic %) |
|---|---|---|---|---|
| 6 | Sputtering effect in magnetic field | $N_2 + H_2O$ | 500 | $(Fe_{97.6}Al_{1.1}V_{0.4}Nb_{0.4}Cu_{0.5})_{94}N_4O_2$ |
| 7 | Sputtering effect in magnetic field | $N_2 + H_2O$ | 300 | $(Fe_{97.6}Al_{1.1}V_{0.4}Nb_{0.4}Cu_{0.5})_{94}N_4O_2$ |
| 8 | Cu effect | $N_2 + H_2O$ | None | $(Fe_{98.1}Al_{1.1}V_{0.4}Nb_{0.4})_{94}N_4O_2$* |
| 9 | Alloy target effect | $N_2 + H_2O$ | None | $(Fe_{97.6}Al_{1.1}V_{0.4}Nb_{0.4}Cu_{0.5})_{94}N_4O_2$ |
| 10 | Ru effect | $N_2 + H_2O$ | None | $(Fe_{96.6}Al_{1.1}V_{0.4}Nb_{0.4}Ru_{1.6})_{94}N_4O_2$ |
| 11 | Cu + Ru effect | $N_2 + H_2O$ | None | $(Fe_{96}Al_{1.1}V_{0.4}Nb_{0.4}Ru_{1.6}Cu_{0.5})_{94}N_4O_2$ |

| Sample | After film formation but before heat treatment (at 1 MHz) Hc (Oe) | Permeability | After heat treatment in rotating magnetic field (1kGauss, 280° C. at 1 MHz) Hc (Oe) | Permeability | Amount of iron eluted (μg) | Amount of head abraded after 12 hour-travel (μm) |
|---|---|---|---|---|---|---|
| 6 | 0.1 | 1500 | 0.05 | 3000 | 70 | 1.2 |
| 7 | 0.1 | 1500 | 0.05 | 3000 | 70 | 1.2 |
| 8 | 0.6 | 1100 | 0.5 | 1300 | 250 | 1.2 |
| 9 | 0.6 | 1100 | 0.5 | 1300 | 180 | 1.2 |
| 10 | 0.7 | 900 | 0.6 | 1100 | 250 | 0.8 |
| 11 | 0.7 | 900 | 0.6 | 1100 | 70 | 0.8 |

Note:
*average composition

As will be appreciated from Tables 1 and 2, the comparison between Experimental Example 3 and Comparative Example 2 revealed that the soft magnetic property of the thin film was improved by the introduction of the steam even in the case where the Fe—M—Cu-based alloy was used as a target. Further, the comparison between Experimental Example 1 and Experimental Example 3, both of which were conducted under the similar condition where the steam is introduced into the reaction system, revealed that the soft magnetic property of the thin film was further improved by the addition of elements such as Al, V, Nb or the like. Furthermore, the comparison between Experimental Examples 4 and 5, and Experimental Example 3 revealed that the heat treatment in rotating magnetic field was effective to improve a soft magnetic property of the thin film.

Conventionally, it is known that the addition of copper into sputtered thin film is useful to improve an anti-corrosion property thereof. However, as is appreciated from the results of Experimental Example 7 in which a copper (Cu) pellet was used as a target, the amount of iron eluted became large due to segregation of copper as compared with those of Experimental Example 3 in which the alloy target was used. In addition, when the amount of iron eluted in Experimental Examples 7 was compared with that in Experimental Example 6 in which copper was not used, no large difference therebetween was obtained. This indicates that the anti-corrosion property of the thin film was not largely improved by the addition of copper. On the other hand, when the sputtering process was carried out by using the alloy target, the difference in the amount of iron eluted between the respective samples became remarkable. This indicates that the effect by the addition of copper was remarkably exhibited when the alloy target was used to introduce copper into the thin film. Accordingly, when copper was introduced by using the alloy target, the anti-corrosion property of the thin film was largely improved by the addition of copper. Thus, it is recognized that the effect by the addition of the respective element can be exhibited when the alloy target was used for the introduction thereof.

Conventionally, it is also known that the addition of ruthenium (Ru) to the sputtered thin film is effective to improve an abrasion resistance thereof. When the results of Experimental Example 6 was compared with those of Experimental Example 9, it was recognized that both compositions were effective to reduce the amount of the thin film abraded so that the abrasion resistance thereof were enhanced. Accordingly, in the present invention, an improved abrasion resistance of the thin film can be also obtained by the addition of ruthenium (Ru).

Thus, when copper or ruthenium was introduced into Fe—N-based soft magnetic film already doped with given elements by using the alloy target, it was confirmed that the thin film having excellent contact resistance, abrasion resistance and soft magnetic property could be obtained.
Experimental Example 10:

In this Experimental Example, oxygen in the form of a steam was introduced into the Fe—N-based soft magnetic thin films already doped with the given elements so that thin films containing oxygen at various concentrations were obtained.

The aimed soft magnetic thin film having a composition of $(Fe_{97.6}Al_{1.1}V_{0.1}Nb_{0.4}Cu_{0.5})_{96-x}N_4O_x$ was produced by sputtering the alloy target having a composition of $Fe_{97.5}Al_{1.1}V_{0.5}Nb_{0.5}Cu_{0.5}$. Upon the sputtering, oxygen was introduced to the thin film in an amount (x) of 0 to 10 atomic % in the form of a steam so that thin films having several selected oxygen concentrations could be obtained.

The sputtering was carried out in the same manner as in Experimental Example 1. Specifically, the magnetic field of 500 G was applied during the sputtering. After completion of the sputtering, the thin film was heat-treated in a rotating magnetic field of 1 kG at 280° C. Among them, the soft magnetic thin film having the afore-mentioned composition in which the amount (x) of oxygen is 2, corresponds to that prepared in Experimental Example 4 above.

Comparative Example 3:

Experimental Example 10 was repeated in the same manner as described above except that oxygen was introduced into the thin film in the form of an oxygen gas instead of a steam.

Various soft magnetic thin films prepared in Experimental Example 10 and Comparative Example 3 and having different amounts or concentrations (x) of oxygen introduced were measured for a magnetic permeability thereof. The dependency of the magnetic permeability on the oxygen concentration is illustrated in FIG. 1.

As will be appreciated from FIG. 1, it was confirmed that the use of the steam enhances a magnetic permeability of the thin film and therefore improves a soft magnetic property thereof to a larger extent as compared with the case where oxygen was introduced in the form of an oxygen gas. The effect of enhancing a magnetic permeability of the thin film by the use of steam could be exhibited when the amount (x) of oxygen added was 15 atomic % or lower, most preferably in the range of 2 to 4.

Experimental Example 11:

In this Experimental Example, primer coat layers composed of various metals were provided in the thin films in order to enhance adhesion of each thin film to the substrate.

Metals having respective polarities were sputtered to form a primer coat layer on a crystallized glass plate. Thereafter, a magnetic layer was formed on the primer coat layer.

Figure 2:
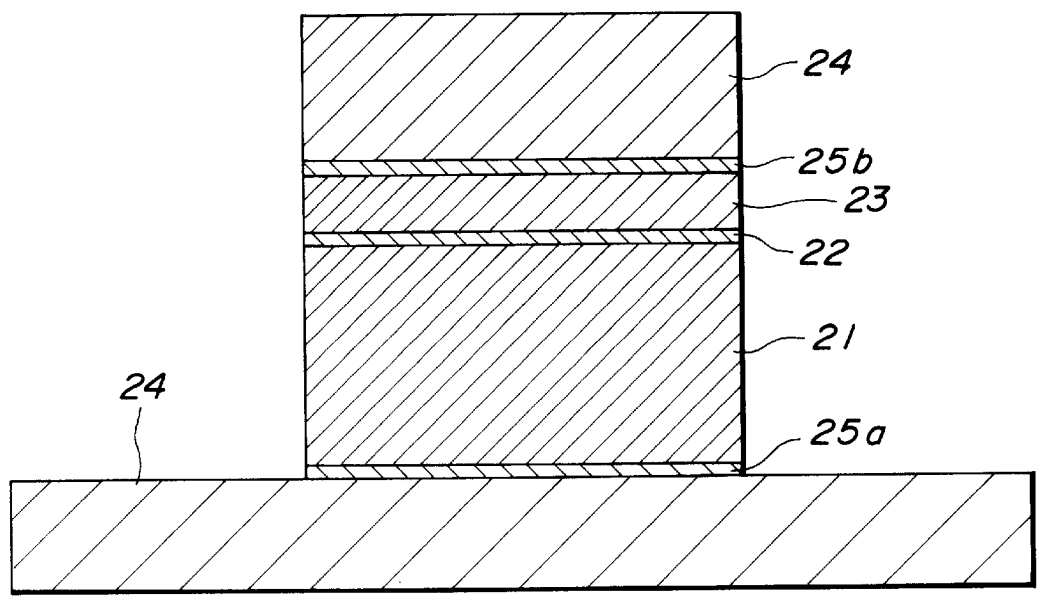
FIG. 2 is a cross-sectional view of a sample used in an adhesion test to examine an adhering force of the soft magnetic thin film shown in FIG. 1.

Specifically, as shown in FIG. 2, the primer coat layer 22 composed of one of Ta, Nb, Zr, Ti, Al, Cr, Mo, W, Pt/Ti (two-layer film), Au/Ti (two-layer film), Pd/Ti (two-layer film), Ag and V, was formed on the glass plate 21 having a size of 5 mm×5 mm. The thickness of the primer coat layer 22 was 50 nm. Formed on the primer coat layer was a magnetic film 23 having a composition of $(Fe_{97.1}Al_{1.1}V_{0.4}Nb_{0.4}Cu_{0.5})_{96}N_4O_2$ and a thickness of 3 μm. The conditions used for the preparation of the magnetic film 23 was the same as those used in Experimental Example 1.

The thus-prepared magnetic film 23 was subjected to an adhesion test by using a tension tester. The adhesion test was described below by referring to FIG. 2.

The primer coat layer and the magnetic film were formed on the glass substrate to prepare a test sample. Thereafter, test jigs 24 were adhered to lower and upper surfaces of the test sample in the form of a laminated element composed of the glass substrate 21, the primer coat layer 22 and the magnetic film 23, through adhesive layers 25a and 25b, as shown in FIG. 2. The thus-constituted test sample was mounted to the tension tester and tested to measure a force required to separate the glass substrate from the magnetic thin film. The results are shown in Table 3 below.

TABLE 3

| Primer coat layer | Average tension force (N/cm³) |
|---|---|
| None | 100 |
| Ta | 640 |
| Nb | 450 |
| Zr | 450 |
| Ti | 530 |
| Al | 400 |
| Cr | 360 |
| Mo | 420 |
| W | 380 |
| Pt/Ti | 400 |
| Au/Ti | 500 |
| Pd/Ti | 440 |
| Ag | 350 |
| V | 480 |

As is appreciated from Table 3, the adhesion force between the glass substrate and the magnetic film sputtered thereon in a steam atmosphere was enhanced by forming the primer coat layer. Among the materials used for the primer coat layer, Ta, Ti and Au/Ti (two-layer film) are especially preferred. The effectiveness of the primer coat layer had been previously found by the present inventors with respect to the magnetic film having a composition of Fe—Al—V—Nb—Cu—Ru—N—O and prepared by introducing an oxygen gas. Further, it was now recognized that the adhesion force between the substrate and the magnetic film prepared by introducing a steam ($H_2O$) could be also enhanced by provision of the primer coat layer.

In the meantime, the afore-mentioned Experimental Examples are only illustrative, and therefore various changes or modifications of arrangements of these magnetic thin films can be made without departing from the scope and sprits of the present invention.

Furthermore, in the afore-mentioned Experimental Examples, only Al, V and Nb are used as the elements added to the magnetic thin film. However, other elements such as at least one of Si, Al, Ta, B, Mg, Ca, Sr, Cr, Mn, Zr, Nb, Ti, Mo, V, W, Hf, Ga, Ge and rare earth elements can be used to attain the same effect.

Second Preferred Embodiment

Figure 3:
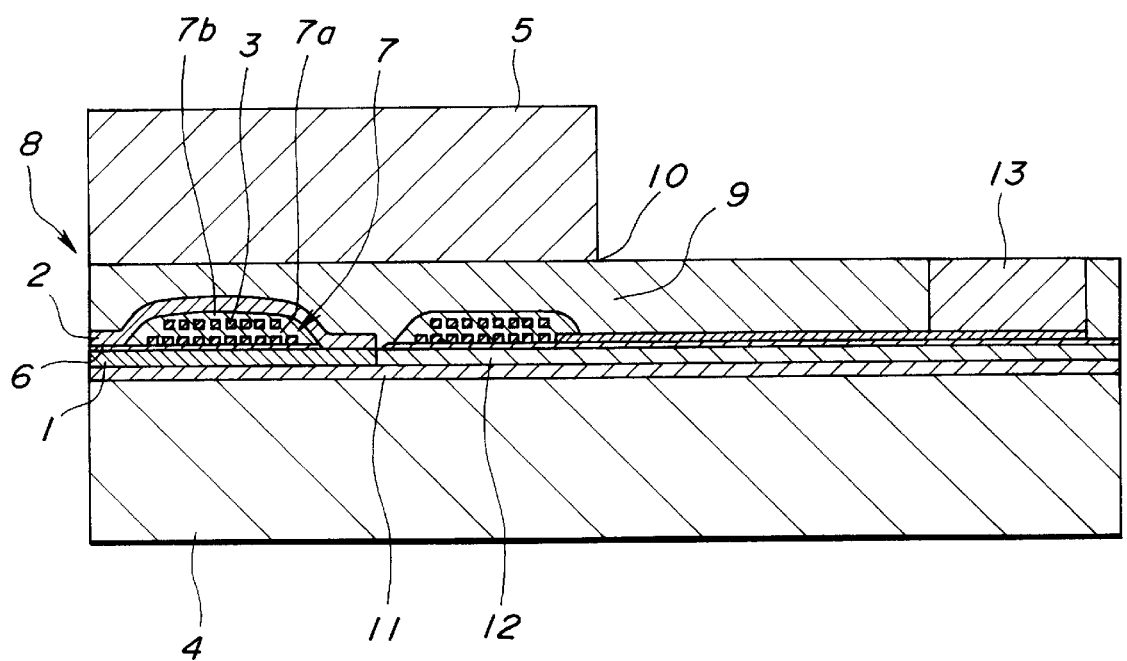
FIG. 3 is a longitudinal cross-sectional view schematically showing a thin film magnetic head according to a second embodiment of the present invention.

Next, a second preferred embodiment of the present invention is now described below. In the second preferred embodiment, the magnetic thin film prepared in the afore-mentioned first preferred embodiment and having a composition of Fe—Al—V—Nb—Cu—N—O was mounted to a thin film magnetic head as shown in FIG. 3.

First, an arrangement of the thin film magnetic head according to the second preferred embodiment of the present invention is explained below.

The thin film magnetic head has lower and upper magnetic core 1 and 2 both having a composition of Fe—Al—V—Nb—Cu—N—O, between which a conductor coil 3 was interposed through various insulating layers.

Specifically, an insulating layer 6 composed of $SiO_2$ and serving for forming a magnetic gap is formed on the lower magnetic core 1. Disposed over the insulating layer 6 is a coil-flattening layer 7 which is composed a resist resin and into which a conductor coil 3 composed of copper is embedded. The upper magnetic core 2 is formed on the coil-flattening layer 7 to constitute a magnetic circuit portion.

The thus-prepared magnetic circuit portion is interposed between a base plate 4 and a protective plate 5 both composed primarily of CaO, TiO$_2$ and NiO to produce the afore-mentioned thin film magnetic head.

Interposed between the lower and upper magnetic cores 1 and 2 composed of Fe—Al—V—Nb—Cu—N—O are the magnetic gap on a side where a slide-contact surface 8 is located and the thin coil 3 embedded in the coil-flattening layer 7 at a center thereof. On a back side of the head, the lower and upper magnetic cores are brought into direct contact with each other without the insulating layer interposed therebetween to form a close circuit.

The conductor coil 3 embedded in the coil-flattening layer 7 serves to supply signals from a recording and reproducing apparatus to a magnetic recording medium. That is, the thus-formed thin film magnetic head serves as a recording head. On the other hand, reading-out of signals recorded on the magnetic recording medium is carried out by a magneto-resistance effect-type thin film magnetic head which is arranged adjacent the recording head in combination, and delivered to the recording and reproducing apparatus.

The base plate 4 is composed primarily of CaO, TiO$_2$ and NiO and has thereon patterns which constitute various sections of the magnetic circuit and formed by various methods inherent to thin film formation techniques, such as photo-lithographic method, etching method, plating method, lift-off method or the like. In accordance with the present invention, in order to provide a well-balanced abrasion or deviated abrasion properties of the head against the magnetic recording medium, the base plate is preferably composed of a non-magnetic material containing CaO, TiO$_2$ and NiO as main components. Four identical magnetic circuits are disposed on the base plate 4 in an equidistantly spaced relation to each other. That is, the thin film magnetic head illustrated in this embodiment, is of a multi-channel type.

The protective plate 5 is adapted to protect the magnetic circuit portions formed on the base plate against an externally applied force, and serves to form the slide-contact surface 8 of the thin film magnetic head. In the formation of the protective plate 5, a protective film 9 composed of Al$_2$O$_3$ or the like is first formed on the upper magnetic core 2. The protective film 9 is subjected to a wrapping process so that an upper surface thereof is flattened. Formed over the flattened upper surface of the protective film is an adhesive layer 10 composed of an epoxy resin or the like through which the protective plate 5 is connected integrally with the protective film 9 and therefore the remainder of the head. For the same reason as mentioned above concerning the base plate 4, the protective plate 5 is preferably composed of a non-magnetic material containing CaO, TiO$_2$ and NiO as main components.

Especially preferably, the thin film magnetic head according to the present invention has the lower and upper magnetic cores 1 and 2 formed from a soft magnetic thin film having a composition of Fe—Al—V—Nb—Cu—N—O. This construction of the thin film magnetic head is advantageous in achieving a high densification recording, because the magnetic thin film composed of Fe—Al—V—Nb—Cu—N—O has a saturation magnetic flux density as high as 2 teslas so that the head can be used together with a magnetic recording medium having a high coercive force, because the magnetic thin film composed of Fe—Al—V—Nb—Cu—N—O can be mounted onto a slide contact-type thin film magnetic head due to its excellent abrasion property, and because the magnetic thin film composed of Fe—Al—V—Nb—Cu—N—O is vapor-deposited at a temperature on the order of 280° C. so that an ordinary resist resin can be used for the preparation of the coil-flattening layer.

Specifically, as the magnetic thin film composed of Fe—Al—V—Nb—Cu—N—O, there can be used the same soft magnetic thin film prepared in the afore-mentioned first preferred embodiment. More specifically, the magnetic thin film may have a composition of $(Fe_aM_bCu_cRu_d)_eN_fO_g$ where a, b, c, d, e, f and g represent an atomic % of the respective elements and M represents at least one element selected from the group consisting of Si, Al, Ta, B, Mg, Ca, Sr, Cr, Mn, Zr, Nb, Ti, Mo, V, W, Hf, Ga, Ge and rare earth elements, with the limitations of $0 \leq b \leq 5$, $0 \leq c \leq 8$, $0 \leq d \leq 5$, $0 \leq c+d \leq 8$, $a+b+c+d=100$, $0.5 \leq f \leq 15$, $0.1 \leq g \leq 13$ and $e+f+g=100$. Further, the soft magnetic thin film is prepared by reaction-sputtering in which a nitrogen and a steam (H$_2$O) are introduced.

The method of preparing the thus-constructed thin film magnetic head is described below.

Figure 4:
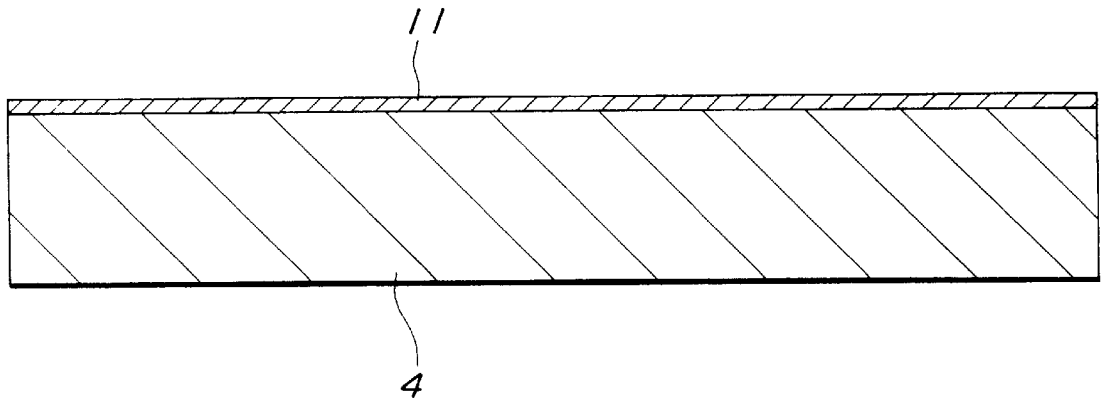
FIG. 4 is a cross-sectional view schematically showing the state in which an insulating layer is formed on a base plate.

First, as shown in FIG. 4, the insulating layer 11 is formed on the base plate 4 composed of a non-magnetic material containing CaO, TiO$_2$ and NiO as main components. The insulating layer 11 serves to electrically and magnetically insulate the base plate 4 from the lower magnetic core 1 subsequently formed thereon, and is prepared by a high-rate RF bias sputtering method or the like.

Next, the base plate is heat-treated under a vacuum condition to remove magneto-striction therefrom and reduce adverse influences by subsequent thermal processes. In this case, the heat treatment was carried out at a temperature of 500° C. Successively, a surface of the insulating layer 11 is flattened and polished in order to remove a warpage of the base plate 4. The polishing was performed in the form of two-stage process including a diamond-polishing (DP) step and a chemical mechano-polishing (CMP) step. In the diamond-polishing (DP) step, a surface plate composed, for example, of copper, tin or the like is used for conducting rough machining. On the other hand, the chemical mechano-polishing (CMP) step is conducted to accomplish fine finishing. In the chemical mechano-polishing (CMP) step, a buff cloth is for example used as a surface plate together with weak-alkaline silicon grains as an abrasive. By conducting both the diamond-polishing (DP) step and the chemical mechano-polishing (CMP) step, the thickness of the insulating layer 11 formed on the base plate 4 is reduced to about 2 μm.

Figure 5:
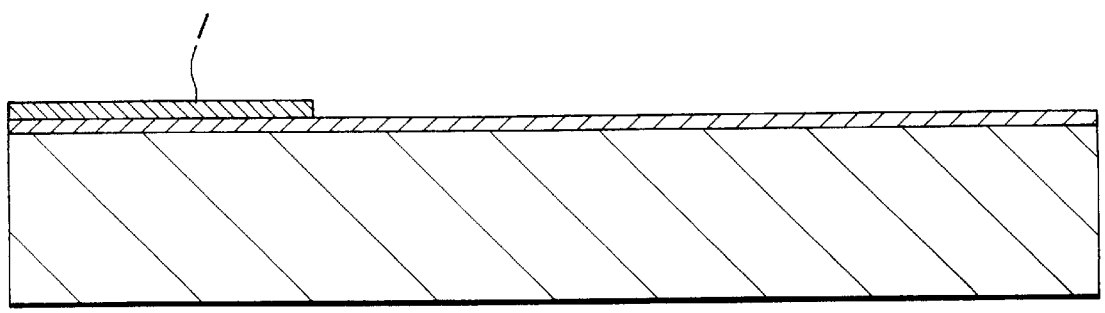
FIG. 5 is a cross-sectional view schematically showing the state in which a thin film having a composition of Fe—Al—V—Nb—Cu—N—O and functioning as a lower magnetic core is formed on the insulating layer.

Next, as shown in FIG. 5, the lower magnetic core 1 in the form of a thin film composed of Fe—Al—V—Nb—Cu—N—O is formed on the insulating layer 11. In advance of the formation of the lower magnetic thin film 1. a thin film composed of tantalum and having a thickness of 50 nm is formed on the insulating layer 11. The tantalum film serves as a primer coat layer whereby an adhering force of the magnetic thin film 1 to the base plate 4 can be enhanced. This is a reason why the soft magnetic thin film prepared in Experimental Example 11 and having the tantalum film as the primer coat layer therein can exhibit a higher adhering force to the substrate as compare to the remainder. Successively, the magnetic thin film as a lower magnetic core 1 having a composition of Fe—Al—V—Nb—Cu—N—O and a thickness of 5.5 μm is formed on the tantalum primer coat layer. The magnetic thin film was formed by using the alloy target doped with the given elements and having a composition of $Fe_{97.5}Al_1V_{0.5}Nb_{0.5}Cu_{0.5}$ while introducing a nitrogen gas and a steam as reaction gases. The film formation is carried out by using an RF sputtering apparatus at an output power of 300 W under a whole pressure of 1.2 mTorr. The nitrogen content and the oxygen content in the magnetic thin film is controlled by regulating the amount of the reaction gases introduced in the atmosphere in the reaction system. By conducting the sputtering in a magnetic field, a magnetic anisotropy is imparted to the magnetic thin film such that a closed magnetic path formed in the magnetic thin film is aligned with a hard axis of magnetization thereof. Further, in view of throwing power occurring depending upon the shape of the magnetic path in the then film magnetic head, the film formation is conducted by uprightly-fixing method.

Next, the thin film composed of Fe—Al—V—Nb—Cu—N—O and prepared under the afore-mentioned conditions was processed to form the lower magnetic core 1 having given patterns. In this case, a photo-resist layer having the given patterns is first formed on the thin film by a photo-lithographic method, and then the thin film is physically etched through the photo-resist layer by an ion-milling method. The photo-resist layer is then removed whereby patterned lower magnetic core 1 is produced.

Figure 6:
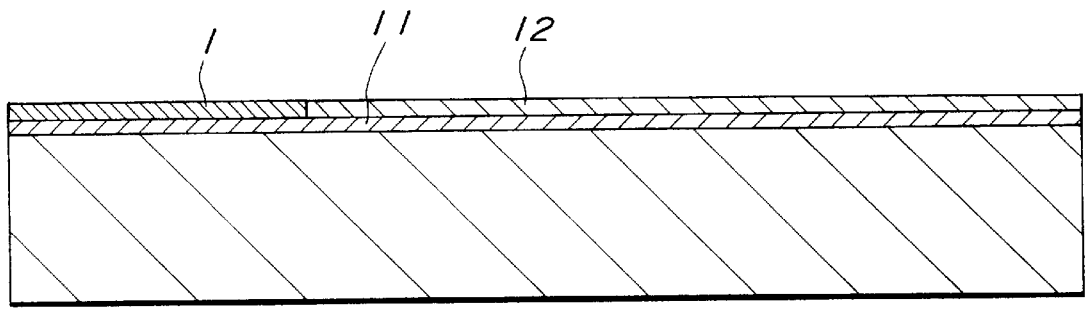
FIG. 6 is a cross-sectional view schematically showing the state in which a flattening film is formed on the thin film.

Next, a flattening film 12 composed of $Al_2O_3$ and having a thickness of 8 μm is formed on the lower magnetic core 1 by a bias sputtering method. The thus-prepared flattening film 12 was then polished to render a surface thereof flat. The polishing of the surface of the flattening film is carried out in the same manner as described above, i.e., the two-stage process including the diamond-polishing (DP) step and the chemical mechano-polishing (CMP) step. First, the flattening film 12 is subjected to the diamond-polishing (DP) step to conduct rough-machining of its surface and then to the chemical mechano-polishing (CMP) step to conduct fine finishing thereof. In this case, as shown in FIG. 6, the polishing process is terminated at the time the surface of the lower magnetic core 1 is exposed to the outside.

Figure 7:
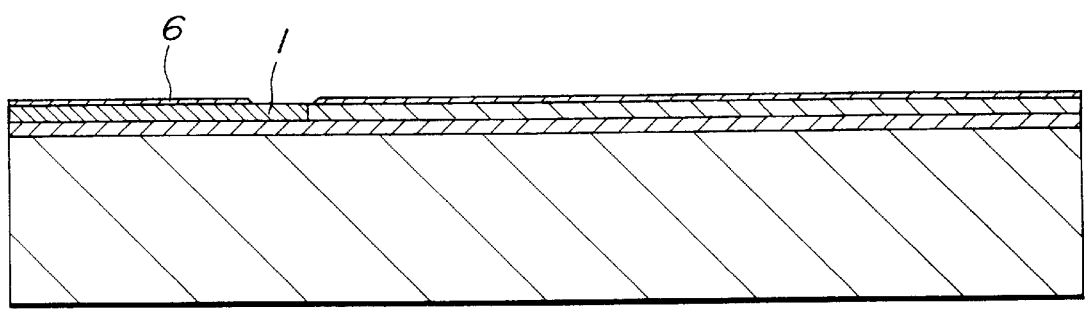
FIG. 7 is a cross-sectional view schematically showing the state in which another insulating layer serving as a magnetic gap is formed on the lower magnetic core.

After the lower magnetic core 1 is flattened by polishing the surface of the flattening film 12, the insulating layer 6 is formed by the RF sputtering method, as shown in FIG. 7, to form a magnetic gap. In this embodiment, the thickness of the insulating layer 6 thus formed is 2 μm. As a material for the insulating layer 6, $SiO_2$, $Al_2O_3$ or the like is generally used. Among them, $SiO_2$ is preferable in view of an etching ability thereof. Further, the insulating layer 6 also serves for electrically and magnetically insulating the subsequently formed thin film coil 3 from the lower magnetic core 1.

Next, a given resist pattern is formed by a photo-lithographic method, and then the insulating layer 6 as a back gap is etched by RIE method or the like. In this embodiment, the insulating layer 6 is etched by 2 μm so as to expose the lower magnetic core 1 located on a back side thereof to the outside.

Figure 8:
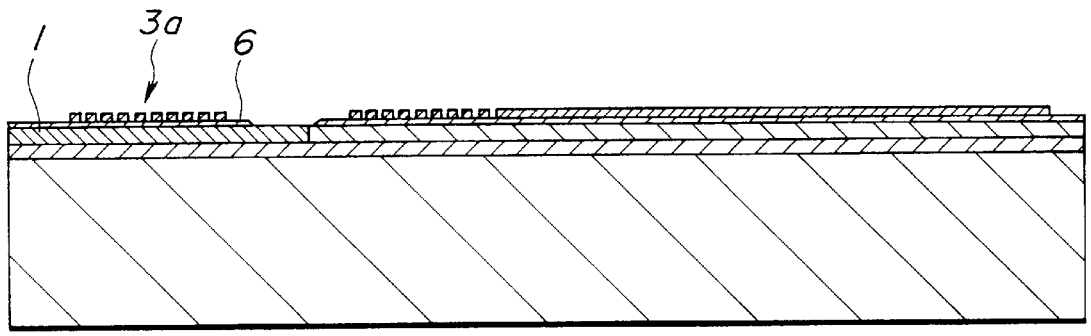
FIG. 8 is a cross-sectional view schematically showing the state in which a lower coil is formed through a primer coat layer on the insulating layer.

Successively, before the thin coil 3 is formed by a plating method, the primer coat layer, for example, a Ti/Cu thin film having thicknesses of 50 nm (Ti) and 200 nm (Cu) by an RF sputtering method or the like. After given resist patterns are formed on the primer coat layer by a photo-lithographic method, a copper-plated layer having a thickness of 4 μm is formed by a plating method using copper sulfate. Thereafter, the resist pattern is removed and then the primer coat layer is etched by an ion-milling method to form a lower coil 3a of the thin coil 3, as shown in FIG. 8.

Figure 9:
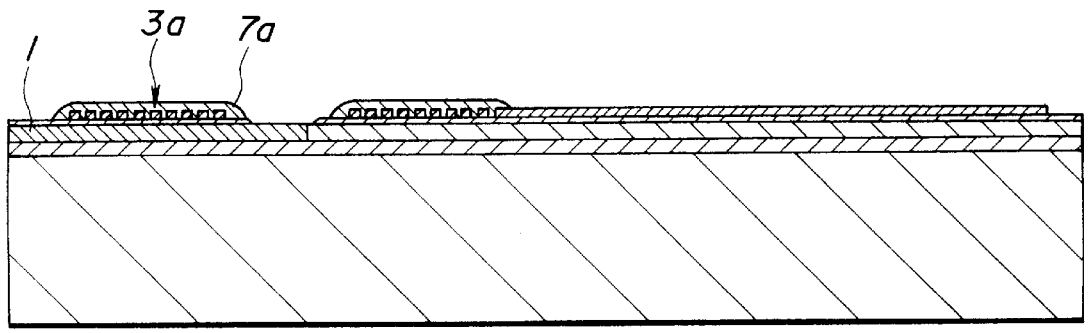
FIG. 9 is a cross-sectional view schematically showing the state in which a first coil-flattening layer is formed on the lower coil.

Further, as shown in FIG. 9, after a given resist pattern is formed on the surface by a photo-lithographic method, a heat-treatment is conducted at a temperature on the order of 300° C. to form a coil-flattening layer 7a on the lower coil 3a. Incidentally, the resist material used for the preparation of the coil-flattening layer 7a may be a positive-type photo-resist containing a novolak resin and Cellosolve acetate as main solvents.

Figure 10:
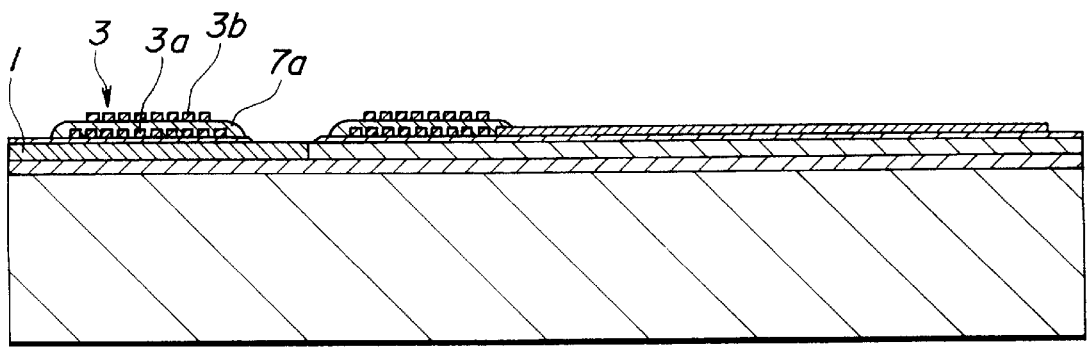
FIG. 10 is a cross-sectional view schematically showing the state in which an upper coil is formed on the coil-flattening layer.

Next, as shown in FIG. 10, an upper coil 3b is formed on the coil-flattening layer 7a so that the thin coil 3 composed of the lower and upper coils 3a and 3b is completed.

In the thin coil 3, the lower coil 3a has 10 turns while the upper coil 3b has 8 turns, namely, the thin coil 3 has 18 turns in total. Thus, the number of turns of the upper coil 3b is less by two than that of the lower coil 3a. This is done by the following two reasons. That is, the first reason is such that, since the coil-flattening layer 7a is likely to suffer from sagging at a periphery thereof, it is necessary to assure a space sufficient to prevent such a sagging in the periphery whereby the formation of a peripheral portion of the coil is facilitated. The second reason is such that a side edge of the coil-flattening layer 7a is moderately inclined so as to prevent deterioration of the lower and upper magnetic cores 1 and 2.

Figure 11:
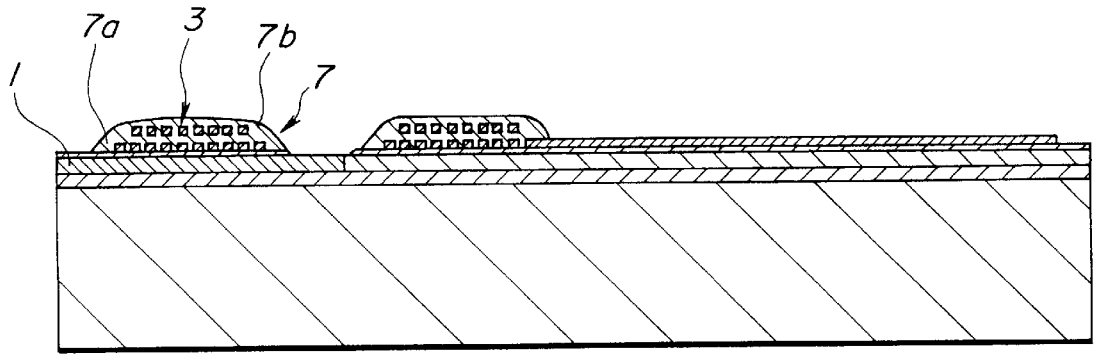
FIG. 11 is a cross-sectional view schematically showing the state in which a second coil-flattening layer is formed on the upper coil.

Thereafter, as shown in FIG. 11, a coil-flattening layer 7b is formed on the upper coil 3b. Thus, the two coil-flattening layers 7a and 7b are provided in view of a flatness because these layers also serves as an underlying layer for the upper coil 2.

Figure 12:
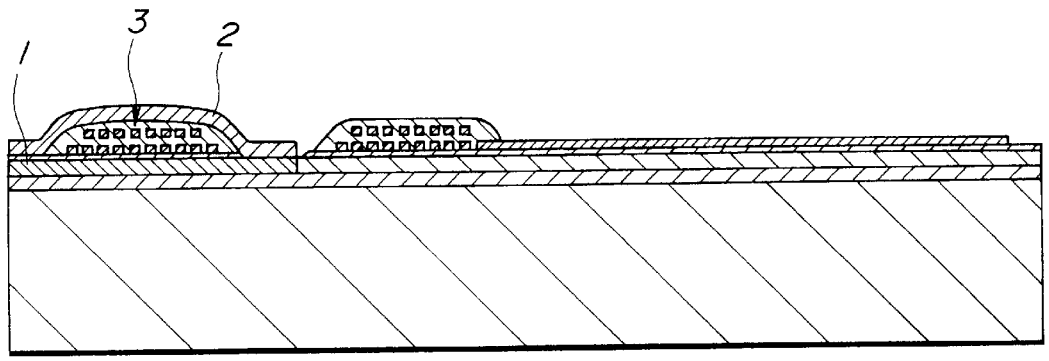
FIG. 12 is a cross-sectional view schematically showing the state in which a thin film having a composition of Fe—Al—V—Nb—Cu—N—O is formed on the second coil-flattening layer.

Next, as shown in FIG. 12, a thin film having a composition of Fe—Al—V—Nb—Cu—N—O is formed on the coil-flattening layer 7b under the same conditions as used for the preparation of the lower magnetic core 1. Specifically, after a given resist pattern is formed on the surface by a photo-lithographic method, etching is conducted according to an ion-milling method. The resist pattern is then removed to form the upper magnetic coil 2.

Figure 13:
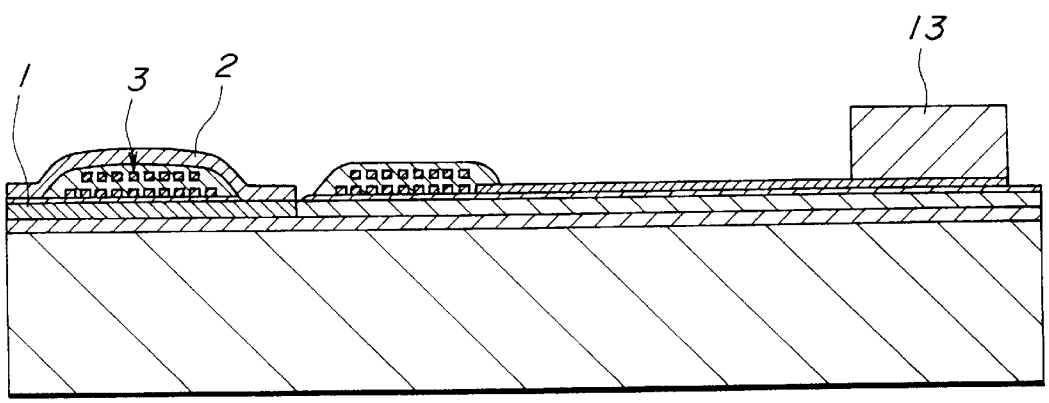
FIG. 13 is a cross-sectional view schematically showing the state in which a copper terminal is formed.

Next, in order to form a lead terminal or electrode for the thin coil 3, plating is conducted using copper sulfate bath. Specifically, a primer coat layer for plating the terminal is formed by an RF sputtering method. The primer coat layer is of two-layer structure composed of a Ti layer having a thickness of 50 nm and a Cu layer having a thickness of 200 nm. Successively, after a resist pattern is formed on the surface by a photo-lithographic method, a thin plated layer, for example Cr-plated layer having a thickness of 30 μm, is formed on the thin coil 3. After removing the resist pattern, the Ti/Cu film is etched by an ion-milling method so that a copper terminal 13 is produced as shown in FIG. 13.

Figure 14:
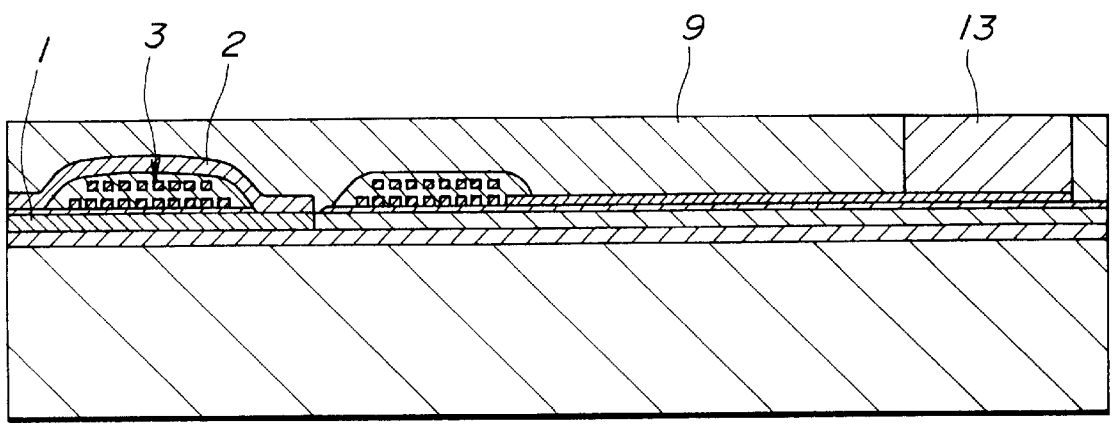
FIG. 14 is a cross-sectional view schematically showing the state in which a further insulating layer is formed.

Successively, as shown in FIG. 14, an insulating layer 9 composed of $Al_2O_3$ and having a thickness of 35 μm is formed by a bias-sputtering method. In order to expose the copper terminal 13 to the outside and subsequently connect the copper terminal with the protective plate 5, a surface of the head wafer is polished by two-stage polishing process including the diamond-polishing (DP) step and the chemical mechano-polishing (CMP) step. The polishing is continued until the surface of the head wafer is flattened in such an extent that the copper terminal 13 is exposed to the outside. As a result, a water-forming processes for the thin film magnetic head according to the present invention are completed.

The thus-produced wafer is cut into individual chips by using a cutting machine. As shown in FIG. 1, The chip is then bonded to the non-magnetic protective plate 5 composed of CaO, $TiO_2$ and NiO by an epoxy resin-based adhesive. Thereafter, a slide contact surface 8 for a magnetic recording medium, which is located on one end of the chip, is machined by a cylindrical grinding method or a profile milling method to form an appropriate radius there. The chip is then polished by a wrapping tape or the like to produce a head chip.

The thus-produced head chip is further processed so that the copper terminal 13 is connected to a flexible cable by a thermo-compression bonding method or a wire-bonding method, whereby the thin film magnetic head according to the present invention can be produced.

The thus-produced thin film magnetic head was tested to evaluate properties or characteristics thereof. The thin film magnetic head prepared above according to the present invention was used as a sample A. On the other hand, for a comparative purpose, a thin film magnetic head having lower and upper magnetic cores composed of Co-based amorphous material, which exhibits a saturation magnetic flux density of 1.2 teslas, was separately prepared and used as a sample B.

Figure 15:
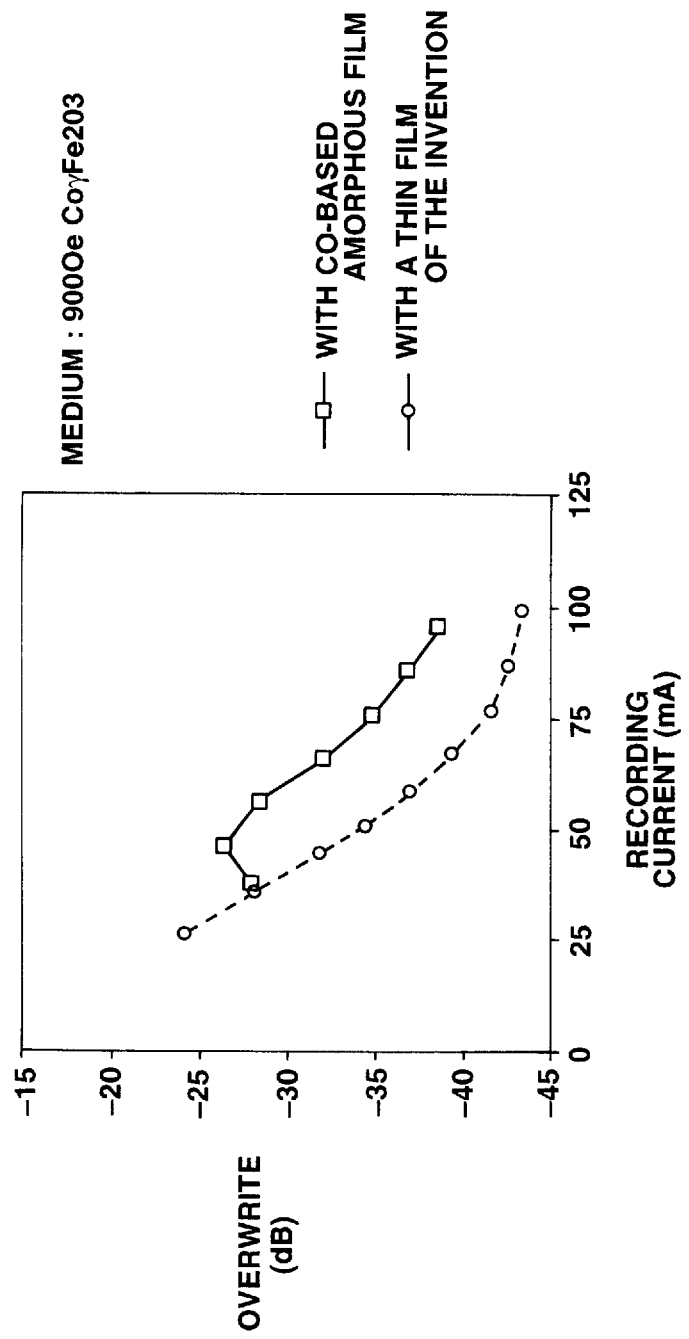
FIG. 15 is a characteristic curve showing a overwriting property of the respective thin film magnetic heads.

First, recording characteristics of the thin film magnetic heads are described. In this embodiment, overwrite characteristic of each thin film magnetic head was examined. The results are shown in FIG. 15. The magnetic recording medium used in the test was composed of Co-γ, $Fe_2O_3$ and exhibited a coercive force of 900 Oe. As is apparently appreciated from FIG. 15, the sample A is superior in overwrite characteristic to the sample B. The superiority of the sample A becomes more remarkable as the coercive force of the magnetic recording medium used is increased.

Figure 16:
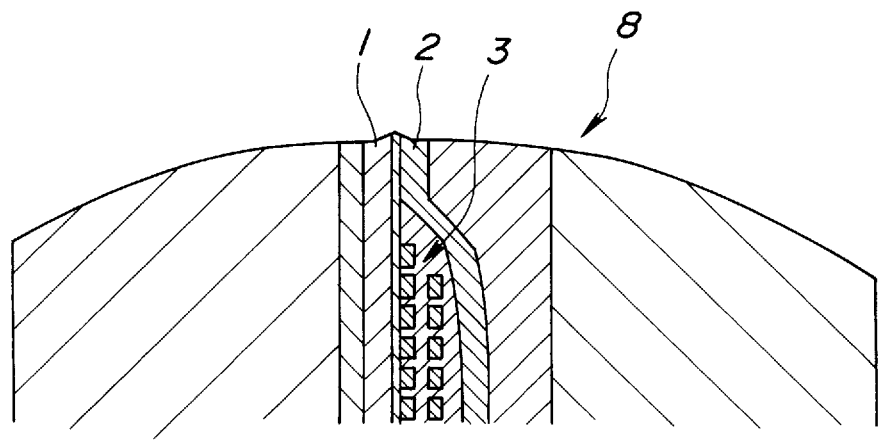
FIG. 16 is a cross-sectional view schematically showing the state in close proximity to a sliding surface of a magnetic recording medium when the thin film magnetic head according to the second preferred embodiment of the present invention is brought into slide contact with the thin film magnetic head.
Figure 17:
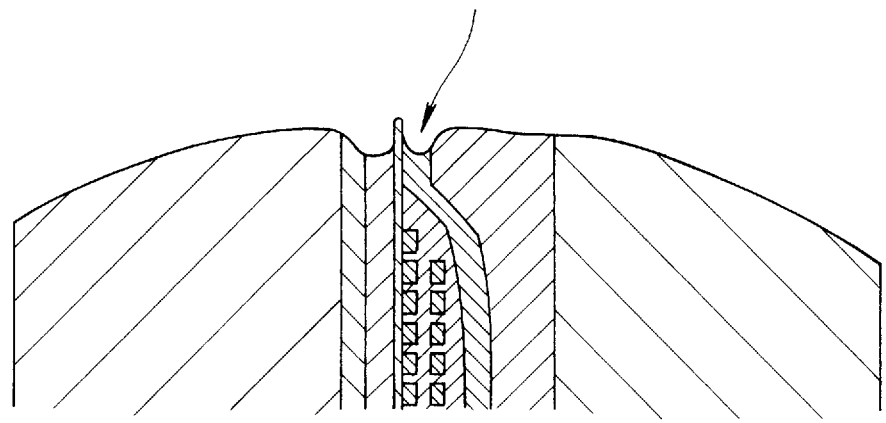
FIG. 17 is a cross-sectional view schematically showing the state in close proximity to a sliding surface of a magnetic recording medium when the thin film magnetic head prepared in Comparative Example is brought into slide contact with the thin film magnetic head.

Next, an abrasion property of each thin film magnetic head was examined. By using the same samples A and B, a magnetic tape was traveled therealong at a traveling velocity of 1 m/sec under conditions of a temperature of 25° C. and a humidity of 50% for 500 hours. The shape of the slide contact surface of each thin film magnetic head was measured by a surface-step measuring device. FIGS. 16 and 17 show the shapes of the samples A and B, respectively. Although the abrasion tests were conducted under the same conditions, a large difference in degree of abrasion of the lower and upper magnetic cores and degree of deviated abrasion of respective magnetic cores and other slide contact elements was observed between the samples A and B. Further, it was confirmed that an extent of the difference observed above or the tendency was kept almost unchanged even though the conditions used in the measurements were varied. The difference in the abrasion or the deviated abrasion became more remarkable when the thin film magnetic head was compared with the conventional thin film magnetic head used for a hard disc, in which a plated film such as Ni—Fe film was incorporated. As a result, it was found that the thin film magnetic head according to the present invention, which had the lower and upper magnetic cores 1 and 2 both having a composition of Fe—Al—V—Nb—Cu—N—O, was also superior in abrasion property to conventional ones.

The afore-mentioned preferred embodiments are only illustrative and therefore the present invention is effectively applicable to various other types of thin film magnetic heads. Especially, the thin film magnetic head according to the present invention is suitably used together with a magnetic-resistance effect device to produce a magnetic head having a laminated structure. Further, the present invention is effectively applicable to magnetic heads having a coil-flattening layer composed of a resist resin, because such coil-flattening layer has to be processed at a temperature as low as 280° C. as used in the present invention. In addition, since the soft magnetic thin film having a composition of Fe—Al—V—Nb—Cu—N—O according to the present invention has a high saturation magnetic flux density, the soft magnetic thin film is useful to achieve a highly-densified recording suited to a magnetic recording medium having a high coercive force. Furthermore, the thin film magnetic head is prevented from suffering from abrasion or deviated abrasion on its slide contact surface to the magnetic recording medium as compared to the conventional ones in which lower and upper magnetic cores composed of Co-based amorphous material or Ni—Fe.

As described above, in accordance with the present invention, the soft magnetic thin film according to the present invention can exhibit not only good soft magnetic properties when heat-treated at a temperature of 300° C. or lower but also an excellent anti-corrosion property, a low magnetostriction, a high saturation magnetic flux density and a high bonding ability to the base plate or substrate.

Further, in accordance with the present invention, since the soft magnetic thin film is used as a material for the lower and upper magnetic cores, the thin film magnetic head can show a high reliability such as abrasion resistance or deviated-abrasion resistance whereby a highly-densified recording can be realized.

What is claimed is:

1. A soft magnetic thin film comprising a soft magnetic thin film selected from the group consisting of:

$(Fe_{96}Al_{1.1}V_{0.4}Nb_{0.4}Ru_{1.6}Cu_{0.5})_{94}N_4O_2$;

$(Fe_{96.6}Al_{1.1}V_{0.4}Nb_{0.4}Ru_{1.6})_{94}N_4O_2$;

$(Fe_{97.6}Al_{1.1}V_{0.4}Nb_{0.4}Cu_{0.5})_{94}N_4O_2$; and $(Fe_{98.1}Al_{1.1}V_{0.4}Nb_{0.4})_{94}N_4O_2$;

said soft magnetic thin film being prepared by a reaction sputtering in which nitrogen and steam ($H_2O$) are introduced.

2. A thin film magnetic head comprising:

lower and upper magnetic cores, each comprising a soft magnetic thin film; and a thin film coil interposed between said lower and upper magnetic cores through insulating layers, said soft magnetic thin films being selected from the group consisting of:

$(Fe_{96}Al_{1.1}V_{0.4}Nb_{0.4}Ru_{1.6}Cu_{0.5})_{94}N_4O_2$;

$(Fe_{96.6}Al_{1.1}V_{0.4}Nb_{0.4}Ru_{1.6})_{94}N_4O_2$;

$(Fe_{97.6}Al_{1.1}V_{0.4}Nb_{0.4}Cu_{0.5})_{94}N_4O_2$; and $(Fe_{98.1}Al_{1.1}V_{0.4}Nb_{0.4})_{94}N_4O_2$;

said soft magnetic thin film being prepared by a reaction sputtering in which nitrogen and steam ($H_2O$) are introduced.

3. A thin film magnetic head having a laminated structure in which a plurality of soft magnetic thin films are laminated through intermediate layers, each of said soft magnetic thin films being selected from the group consisting of:

$(Fe_{96}Al_{1.1}V_{0.4}Nb_{0.4}Ru_{1.6}Cu_{0.5})_{94}N_4O_2$;

$(Fe_{96.6}Al_{1.1}V_{0.4}Nb_{0.4}Ru_{1.6})_{94}N_4O_2$;

$(Fe_{97.6}Al_{1.1}V_{0.4}Nb_{0.4}Cu_{0.5})_{94}N_4O_2$; and $(Fe_{98.1}Al_{1.1}V_{0.4}Nb_{0.4})_{94}N_4O_2$;

said soft magnetic thin film being prepared by a reaction sputtering in which nitrogen and steam ($H_2O$) are introduced.

4. A soft magnetic thin film as claimed in claim 1, wherein said soft magnetic thin film is prepared in a magnetic field not less than 1 kA/m but not more than 1,000 kA/m.

5. A soft magnetic thin film as claimed in claim 1, wherein said soft magnetic thin film is heat-treated in a rotating magnetic field after completing the formation thereof.

6. A soft magnetic thin film as claimed in claim 1, further comprising a primer coat layer disposed adjacent to said soft magnetic thin film and comprising at least one metal selected from the group consisting of Ta, Nb, Zr, Ti, Al, Cr, Mo, W, Pt, Au, Pd, Ag and V.

7. A thin film magnetic head as claimed in claim 3, wherein said intermediate layers are each composed of at least one metal material selected from the group consisting of Ta, Nb, Zr, Ti, Al, Cr, Mo, W, Pt, Au, Pd, Ag and V.

* * * * *